United States Patent [19]
Ormond

[11] 3,805,604
[45] Apr. 23, 1974

[54] LOAD CELL AND FLEXURE MEANS FOR TRANSFERRING FORCE THERETO

[76] Inventor: Alfred Newman Ormond, 11969 E. Rivera Rd., Santa Fe Springs, Calif. 90670

[22] Filed: Apr. 25, 1973

[21] Appl. No.: 354,235

[52] U.S. Cl............................. 73/141 A, 177/211
[51] Int. Cl............................. G01g 3/14, G01l 5/12
[58] Field of Search................. 177/210, 211, 229; 73/141 A

[56] References Cited
UNITED STATES PATENTS

| | | | |
|---|---|---|---|
| 3,554,026 | 1/1971 | Seed | 177/211 X |
| 3,439,761 | 4/1969 | Laimins | 177/211 |
| 3,576,128 | 4/1971 | Lockery | 177/211 X |
| 3,667,560 | 6/1972 | Cooke | 177/211 |

*Primary Examiner*—George H. Miller, Jr.
*Attorney, Agent, or Firm*—Pastoriza & Kelly

[57] ABSTRACT

A flexure frame includes top, bottom, rear, and front plates secured together to define a generally rectangular shape. The top and bottom plates includes flexure webs adjacent to the rear and front edges of the plates such that the rectangular frame can flex into a parallelogram shape when the rear plate is anchored to a stationary structure to cantilever the frame and a downward force is applied to the top plate adjacent to its front edge. An elongated load cell is secured between the rear and front plates and includes a load cell flexure adjacent to its securement to the front plate so that when a force is applied to distort the flexure frame into a parallelogram shape, the force is transferred as a shear force to the load cell flexure web which in turn translates this shear force into a bending moment on the load cell. Essentially bending and torsion moments resulting from an off center applied force to the top plate are isolated from the load cell so that only the downward vector force itself is measured by the load cell.

4 Claims, 3 Drawing Figures

PATENTED APR 23 1974  3,805,604

3,805,604

LOAD CELL AND FLEXURE MEANS FOR TRANSFERRING FORCE THERETO

This invention relates generally to load measuring systems and more particularly to an improved load cell and flexure means for transferring force to the load cell.

BACKGROUND OF THE INVENTION

In the measurement of certain forces, load cells in the form of deformable columns or bending beams including suitable strain gauges are often used. One problem encountered is that undesirable forces are also sometimes measured by the load cell. For example, if the particular force to be measured is not applied at a proper point but rather is off centered, force components such as bending and torsion moments can be created which render the reading provided by the strain gauges on the load cell inaccurate unless such forces are isolated.

An example of the foregoing problem is in a simple weighing scale having a large area tray upon which an object to be weighed is placed. If the object is placed towards a corner of the tray, bending and torsional moments can be transferred to the load cell measuring system beneath the tray giving rise to spurious output signals.

BRIEF DESCRIPTION OF THE PRESENT INVENTION

With the foregoing in mind, the present invention contemplates a flexure means in combination with a load cell for transmitting a force to the load cell in such a manner that undesirable shear force components along with binding and torsion moments are completely isolated from the load cell so that a more accurate measurement is provided. More particularly, the flexure means comprises a frame structure having at least four flexure webs spaced to define the corners of a rectangle such that a force applied to one end of the frame when the other end is secured in a stationary position causes the frame to flex so that the rectangle becomes a parallelogram. A load cell in turn is secured between the one and other end of the frame, the load cell having a thinned portion defining a load cell flexure adjacent to said one end of the frame. The arrangement is such that a force applied to the end of the frame tending to transform it into a parallelogram is transferred to the load cell as a shear force, the load cell flexure in turn translating this shear force into a bending moment acting on the load cell.

Because of the parallelogram arrangement, bending and torsion moments are isolated from the load cell should the applied load be off center.

BRIEF DESCRIPTION OF THE DRAWINGS

A better understanding of the invention will be had by now referring to the accompanying drawings in which.

DETAILED DESCRIPTION OF THE INVENTION

Figure 1:
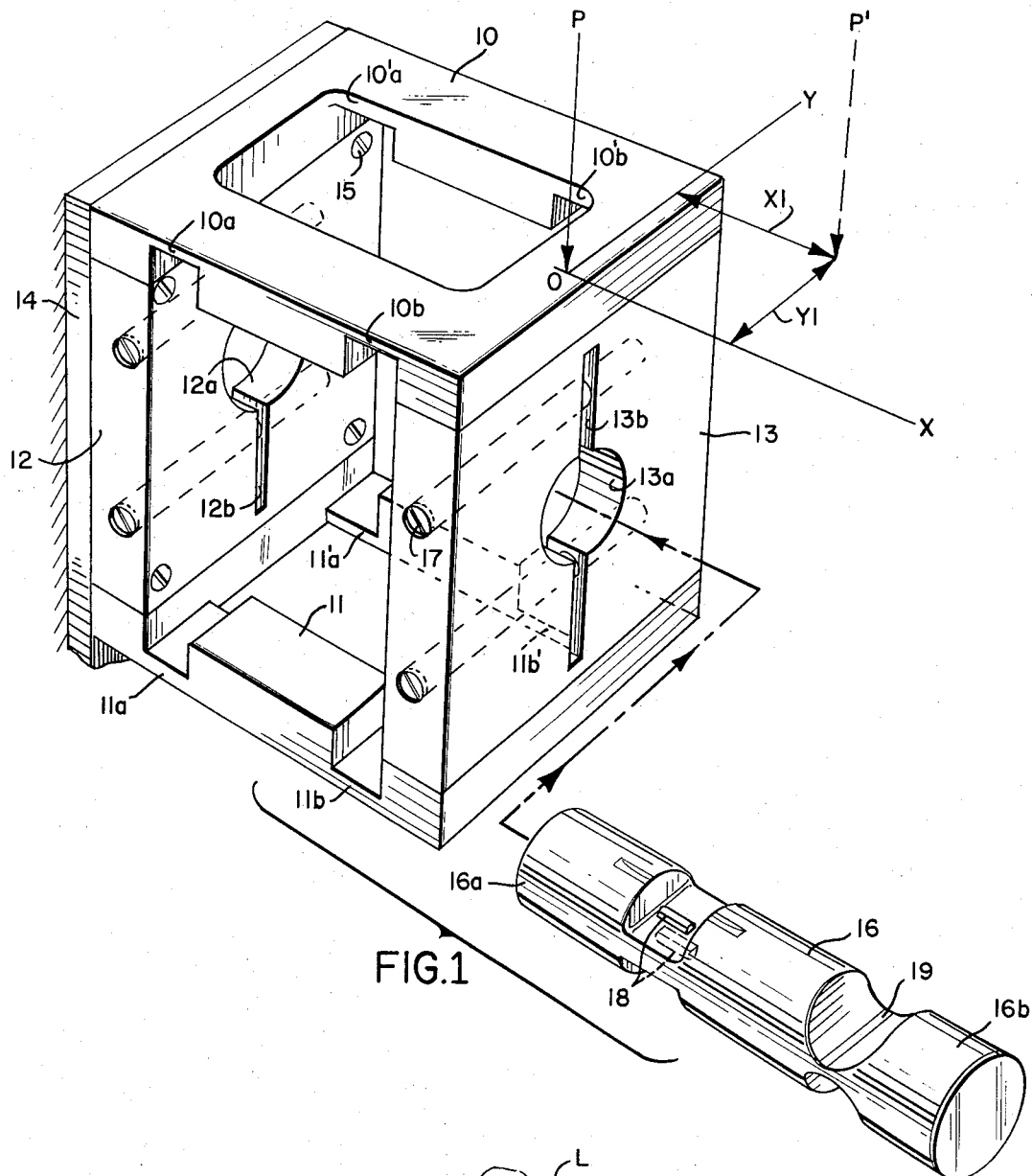
FIG. 1 is a perspective view in exploded form of the flexure means and load cell of the invention.

Referring first to FIG. 1 there is shown a flexure means including a top plate 10, bottom plate 11, rear plate 12, and front plate 13 defining a generally rectangular frame. The rear plate 12 is secured to a stationary structure 14 as by bolts one of which is shown at 15 so as to cantilever the generally rectangular frame.

As shown, the top and bottom plates 10 and 11 each include thinned portions defining flexure webs in the plane of the plates adjacent to the rear and front edges of the plates. In the particular embodiment chosen for illustrative purposes, the top and bottom plates 10 and 11 include central cut outs so that there are two thinned portions 10a and 10a' adjacent to the rear edge and two thinned portions 10b and 10b' adjacent to the front edge in the top plate 10. Similarly, there are two thinned portions 11a and 11a' adjacent to the rear edge and two thinned portions 11b and 11b' adjacent to the front edge in the bottom plate 11.

With the rear plate 12 anchored to the stationary structure 14 to cantilever the frame as described, when a force P is applied to the central top front edge of the plate 10, the rectangular frame can flex into a parallelogram shape since the various flexures described are located at the four corners of a rectangle.

Constituting part of the flexure means but shown exploded away therefrom is an elongated load cell 16 having cylindrical end portions 16a and 16b arranged to be secured to central portions of the rear and front plates 12 and 13 to extend normally between the plates in parallel relationship to the top and bottom plates 10 and 11. In the particular embodiment disclosed, this securing means is effected by providing cylindrical bores 12a and 13a in the rear and front plates 12 and 13 respectively for receiving the ends 16a and 16b respectively of the load cell. Saw cuts such as indicated at 12b and 13b cooperating with transverse bolts such as indicated at 17 for the saw cut 13b permit clamping of the ends of the load cell in the cylindrical bores.

It should be understood that the ends of the elongated load cell 16 may be integrally formed with the plates 12 and 13 and in fact the top and bottom plates 10 and 11 can also be integrally formed with the rear and front plates and load cell so that the entire structure constitutes an integral unit.

In FIG. 1 there is shown at the point of application of the force P the origin of a rectangular co-ordinate system X and Y. If the force P is applied off center from the central portion of the front edge of the top plate 10 such as indicated at P', there will be generated bending and torsion moments in the flexure frame. For example, the displacement Y1 defines the moment arm of a torsion moment created by the displaced application of force and the displacement X1 gives rise to the bending moment.

The design of the flexure frame as described in FIG. 1 is such that the foregoing bending and torsion moments are isolated from the load cell 16.

Referring once again to the load cell 16, it will be noted that top and bottom portions of the cell include strain gauge means 18. Further, the load cell includes a thinned portion 19 adjacent its end 16b secured to the front plate 13 defining a flexure web which is generally parallel to the flexure webs on the top and bottom plates 10 and 11.

Figures 2, 3:
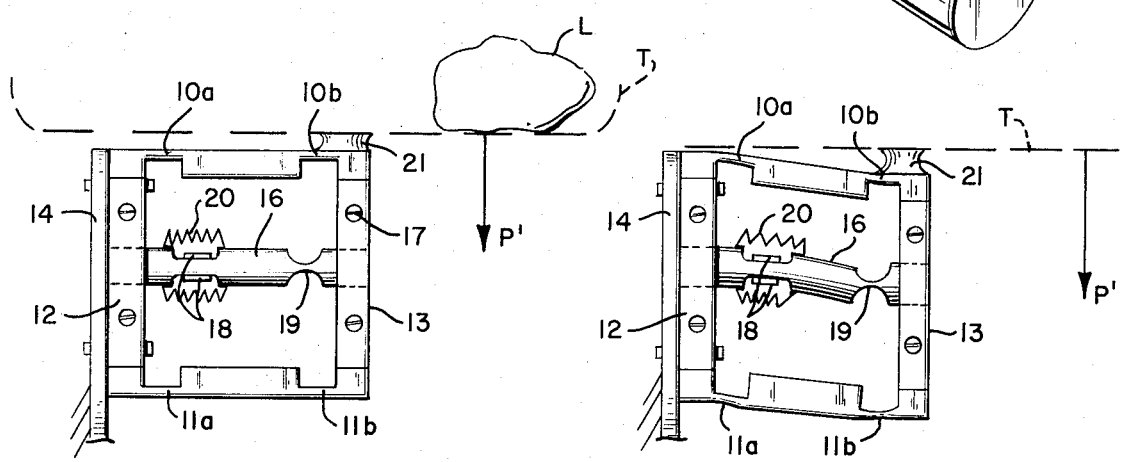
FIG. 2 is a side elevational view of the load cell of FIG. 1 wherein there is shown an object to be weighed; and, FIG. 3 is a view similar to FIG. 2 illustrating in greatly exaggerated form deformation of the flexure means and load cell as a consequence of an off center force applied to the structure.

Referring now to FIG. 2, it will be noted that the strain gauges 18 are enclosed within a bellows schematically indicated at 20. As will become clearer as the description proceeds, the top and bottom strain gauges 18 measure tension and compression forces in the load cell 16 as a consequence of bending of this load cell. These strain gauge means may be placed in a conventional bridge circuit to provide measurement of the degree of bending and thus a measurement of force transferred to the cell through the flexure frame.

Referring to the upper portion of FIG. 2, there is schematically indicated by the dashed line a platform or tray T secured as at 21 to the central portion of the top front edge of the top plate 10. A load is schematically depicted by the dashed lines at L which might be a product or item to be weighed by the load cell. In FIG. 2, the product L is shown off center towards a corner of the tray T giving rise to a force P' in a position designated by the X1, Y1 co-ordinates of FIG. 1. This off center force includes bending and torsion moments transferred to the rectangular frame at the securement point 21 of the tray T.

As a specific example, if the structure is used as a weighing scale in a meat department, it is not infrequent that the butcher will simply place a load of meat on the weighing tray in an off center position, that is, towards a corner or side of the tray.

Referring to FIG. 3, there is shown in greatly exaggerated form the flexing of the rectangular frame into a generally parallelogram shape as a consequence of the load P'.

OPERATION

In operation, the load cell 16 if formed as a separated item is thoroughly clamped, bolted, welded, or otherwise secured to the central portions of the rear and front plates 12 and 13 shown in FIG. 1. As mentioned heretofore, the load cell body may actually constitute an integral portion of these plates. In the absence of any load, the frame will appear as a general rectangle as viewed in side elevation in FIG. 2.

If now a load L is applied to the tray T to give rise to the off center force P' as indicated, there will be generated bending and torsion moments as described heretofore in conjunction with FIG. 1.

With specific reference to FIG. 3, the distortion of the rectangular frame into a parallelogram shape is a consequence of the bending of the flexures 10a, 10b, 11a and 11b, the remaining portions of the top and bottom plates and the rear and front plates being rigid. Because of the constraining of movement of the front plate 13 as a consequence of the rectangular to parallelogram flexing, the referred to bending and torsion moments are isolated from being transferred to the load cell 16. Actually, only the downward or vertical load is transferred to the load cell and this force is transferred in the form of a shear force to the load cell flexure web 19.

The shear force applied to the load cell flexure web 19 is translated by the flexure web into a bending moment acting directly on the load cell 16 to effect a bending thereto as illustrated in FIG. 3.

It will be evident that bending of the load cell 16 as shown will result in the top strain gauge under the bellows 20 being placed in tension and the bottom strain gauge being placed in compression.

Suitable electrical signals may be derived from the strain gauge means to provide a measurement of the downward force.

While the top and bottom plates have been shown as including cut-outs to provide essentially pairs of flexure webs adjacent the rear and front edges of the plates, it should be understood that the top and bottom plates can be solid throughout so that there are effectively only two elongated thinned portions adjacent the rear and front edges thus providing the desired two flexure points. The provision of the cut-outs provides for greater sensitivity in that a greater degree of flexing of the plates can take place. However, it will be understood that the flexing can only occur at the thinned portions or flexure webs, the remaining portions of the plates being rigid so that only the parallelogram type movement can take place. The bending and torsion moments thus created when an off center load is applied to the flexure frame are absorbed in the frame and only the vertically directed downward component of force is measured by the load cell.

While the load cell and load cell flexure web have been described as a bending beam, any suitable load cell such as a guided cantilever, a shear element, or a truss structure can be used.

Further, while four flexures defining the four corners of a rectangle have been shown, it is possible to make the top and bottom plates each of a thin continuous material to define a single web which would distort into an S shape. In this case, there would only be two flexures involved.

From the foregoing description, it will thus be evident that the present invention has provided a greatly improved measuring system wherein greater accuracy is realized as a consequence of a flexure means capable of isolating bending and torsion moments from reaching the co-operating load cell.

What is claimed is:

1. A load cell and flexure means for transferring a force to the load cell, comprising, in combination:
   a. top, bottom, rear, and front plates defining a generally rectangular frame, the top and bottom plates each including thinned portions defining flexure webs in the plane of the plates adjacent to the rear and front edges of the plates such that the rectangular frame can flex into a parallelogram shape when the rear plate is anchored to a stationary structure to cantilever the frame, and a downward force is applied to the top plate adjacent to its front edge; and,
   b. a load cell secured to central portions of said rear and front plates to extend normally between the plates in parallel relationship to said top and bottom plates, whereby if a downward directed force is applied to said top plate off from the center of the top front edge portion of the plate so that bending and torsion moments are generated, said bending and torsion moments are isolated from reaching said load cell as a consequence of the frame flexing into a parallelogram and said force is transferred in shear to said load cell to provide in response to the shear force a measurement of said force.

2. The subject matter of claim 1, in which said top and bottom plates each include central cut-outs so that there are two thinned portions adjacent to the rear edge and two thinned portions adjacent to the front edge in the top plate and two thinned portions adjacent to the rear edge and two thinned portions adjacent to the front edge in the bottom plate defining said flexure webs.

3. The subject matter of claim 1, in which said load cell is elongated, the forward portion of the cell adjacent to its securement to the front plate having a thinned portion to define a load cell flexure web parallel to the first mentioned flexure web, the force transferred in shear to the load cell flexing said load cell flexure web so that said load cell functions as a bending beam.

4. The subject matter of claim 3, in which said top, bottom, rear, and front plates are integrally formed.

* * * * *